US008121631B2

(12) United States Patent
Goia et al.

(10) Patent No.: US 8,121,631 B2
(45) Date of Patent: Feb. 21, 2012

(54) METHOD AND COMMUNICATION SYSTEM FOR CALCULATING A RISE-OVER-THERMAL (ROT) THRESHOLD VALUE

(75) Inventors: Alessandro Goia, San Benigno Canavese (IT); Andrea Pavon, Ivrea (IT); Luca Meneghini, Pavone Canavese (IT)

(73) Assignees: Vodafone Omnitel N.V., Amsterdam (NL); Vodafone Group PLC, Berkshire (GB)

( * ) Notice: Subject to any disclaimer, the term of this patent is extended or adjusted under 35 U.S.C. 154(b) by 112 days.

(21) Appl. No.: 12/788,470

(22) Filed: May 27, 2010

(65) Prior Publication Data

US 2010/0304778 A1    Dec. 2, 2010

(30) Foreign Application Priority Data

May 28, 2009    (IT) .............................. MI2009A0944

(51) Int. Cl.
    *H04B 7/00* (2006.01)
(52) U.S. Cl. .......... 455/522; 455/67.11; 455/68; 455/69
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | |
|---|---|---|---|
| 7,304,971 B2 * | 12/2007 | Balachandran et al. | 370/337 |
| 7,324,821 B2 * | 1/2008 | Kwak et al. | 455/453 |
| 7,403,800 B2 * | 7/2008 | Han et al. | 455/561 |
| 7,525,909 B2 | 4/2009 | Fan et al. | |
| 7,724,701 B2 * | 5/2010 | Lundby et al. | 370/328 |
| 7,733,846 B2 * | 6/2010 | Liu | 370/352 |
| 7,738,419 B2 * | 6/2010 | Kwon et al. | 370/329 |
| 7,881,725 B2 * | 2/2011 | Rong et al. | 455/453 |
| 8,031,686 B2 * | 10/2011 | Li et al. | 370/342 |
| 2004/0121808 A1 * | 6/2004 | Hen et al. | 455/561 |
| 2004/0192208 A1 * | 9/2004 | Kong et al. | 455/63.1 |
| 2004/0219920 A1 * | 11/2004 | Love et al. | 455/442 |
| 2004/0228349 A1 * | 11/2004 | Vrzic et al. | 370/395.4 |
| 2005/0220042 A1 * | 10/2005 | Chang et al. | 370/278 |
| 2005/0250511 A1 | 11/2005 | Xiao et al. | |
| 2006/0045045 A1 | 3/2006 | Blessent et al. | |
| 2006/0252429 A1 * | 11/2006 | Chen et al. | 455/450 |
| 2007/0099648 A1 * | 5/2007 | Kim et al. | 455/522 |
| 2007/0177556 A1 * | 8/2007 | Chen | 370/338 |
| 2007/0202826 A1 * | 8/2007 | Dean | 455/230 |
| 2008/0004031 A1 | 1/2008 | Rong et al. | |
| 2008/0144582 A1 * | 6/2008 | Das et al. | 370/335 |

(Continued)

OTHER PUBLICATIONS

Italian Search Report for IT MI20090944.

(Continued)

*Primary Examiner* — Dominic E Rego
(74) *Attorney, Agent, or Firm* — B. Aaron Schulman, Esq.; Stites & Harbison, PLLC

(57) ABSTRACT

A method for calculating a RoT threshold value in a communication system in which user terminals communicate with a base transceiver station, comprising the steps of providing a RoT minimum, maximum and margin, acquiring the maximum nominal transmit power of each user terminal, detecting the transmitted power of each user terminal, calculating the power difference between the maximum nominal transmit power and the transmitted power for each user terminal, and processing this power difference calculated for each user terminal, the RoT margin and the minimum and maximum RoT threshold to calculate the RoT threshold value.

16 Claims, 3 Drawing Sheets

U.S. PATENT DOCUMENTS

2008/0198802 A1* 8/2008 Zhang et al. .................. 370/329
2008/0305824 A1* 12/2008 Haim et al. ................... 455/522
2009/0054072 A1* 2/2009 Chen et al. .................... 455/450
2009/0264142 A1* 10/2009 Sankar et al. ................. 455/501
2010/0176756 A1* 7/2010 Kawashima ............... 318/400.1

OTHER PUBLICATIONS

Written Opinion for IT MI20090944.
Extended European Search Report for Corresponding Application EP 10163734.6.

* cited by examiner

METHOD AND COMMUNICATION SYSTEM FOR CALCULATING A RISE-OVER-THERMAL (ROT) THRESHOLD VALUE

TECHNICAL FIELD

The present invention concerns a method and a communication system for calculating a Rise-over Thermal (RoT) threshold value.

BACKGROUND OF THE INVENTION

Communication systems are widely used to provide services, such as voice, video, data, messaging, broadcast, etc. These systems can be multiple-access and support a plurality of users who share the available system resources. Code division multiple access (CDMA) systems, such as the UMTS system and its evolutions, HSDPA and HSUPA, or frequency division systems (FDMA and OFDMA) are examples of these systems.

A typical communication system comprises a plurality of cells, each one divided into a plurality of sectors. Each cell contains a base station subsystem, BSS in GSM systems, or a radio network subsystem, RNS in UMTS systems, able to provide communication services to each user terminal (UE) located in that cell. Each base station subsystem BSS/RNS comprises a plurality of base transceiver stations, BTS in GSM systems and NodeB in UMTS systems, each able to communicate wirelessly with the user terminals UE located in the sectors of the cell served by the BSS. Many communication systems, such as the GSM or UMTS systems and their evolutions, also comprise a radio network controller, BSC in GSM systems and RNC in UMTS systems, in signal communication with each BSS/RNS and a plurality of user terminals, each one in signal communication with one or more BTS/NodeB.

The connection between the user terminals UE and the BTSes is defined by a downlink leg, from the BTS to the user terminals UE, and an uplink leg, from the user terminals UE to the BTS.

It should be pointed out that the user terminals UE can transmit simultaneously in uplink to the BTS and thus cause general interference in the transmission from other terminals UE to the BTS. In particular, the quality of a signal received by a BTS from a terminal UE depends on various factors, including the power transmitted from the terminal UE, losses on the path from the terminal UE to the BTS, interference generated by other terminals UE, phase shifts introduced on the signal itself due to multiple paths created following signal reflection and or refraction when obstacles are encountered, etc.

In consequence, total interference at the BTS increases as the transmitted power from the terminals UE increases and as the number of terminals UE increases.

Furthermore, as interference increases, the system instructs the single terminal UE to increase the power of the transmitted signal in order to receive said signal with a minimum quality that is sufficient to decode the communication correctly.

On the other hand, the terminals UE cannot increase transmitted power beyond their maximum nominal power and the communication system, in order to preserve the possibility for all terminals UE to communicate with the BTS, cannot tolerate an increase in interference beyond a predefined limit.

Thus, in the presence of a plurality of terminals UE, the capacity of the system is limited by the interference on the uplink leg.

A measure of the interference on the uplink leg is provided by the Rise-over-Thermal (RoT) parameter, defined as the ratio between total noise and the interference produced by the terminals UE with the thermal noise in a cell.

The RoT parameter therefore represents a fundamental measurement for controlling the load on the uplink.

The RNS must therefore guarantee an overall interference received by the BTS that does not compromise the coverage of the cell itself, setting an admissible maximum interference limit, namely a RoT threshold.

The 3GPP UMTS standard contemplates that the network access controller RNC communicates the maximum admissible cell load to the NodeB. This communication takes place via the NBAP Physical Shared Channel Reconfiguration procedure. In detail, the RNC indicates the total maximum power in reception (Maximum Target Received Total Wide Band Power) and, optionally, the reference background noise (Reference Received Total Wide Band Power) in the NBAP Physical Shared Channel Reconfiguration Request message.

The RoT parameter represents the ratio between these two values and, as known in the literature, the capacity of the uplink leg has a logarithmic relation with the RoT value, so that the larger the allowed RoT value, the greater is the capacity of the cell and the maximum throughput serviceable from the NodeB.

On the other hand, it is necessary to note that an increase in the RoT threshold value causes a contraction of the uplink leg's coverage. Initially, the contraction in coverage, due to the increase in interference from the mobile terminals, is compensated by the rise in power of the mobile terminals through the known "fast power control" functionality.

When the power being used reaches the maximum nominal transmission power for the mobile terminal, said compensation is no longer possible and the need arises to perform a handover to other systems, if present. In the absence of these actions, there is the risk of impairing the quality of the communication or even of not being able to continue the communication. This problem typically occurs on the mobile terminals furthest away from the NodeB antennas.

From the above explanation, it follows that to keep the load on the uplink leg below a preset level and avoid system instability, it is fundamental to estimate the RoT threshold value in a precise manner.

WO 2004/114715 describes a method and an apparatus for the dynamic adjustment of the RoT threshold in a wireless communications system. In particular, the RoT threshold is dynamically increased or decreased upon detection, by a RoT threshold processor of a radio base station, of the outage of at least one terminal UE. The RoT threshold is initially set to a preset minimum value ROT_MIN and the RoT threshold processor checks for the presence of outage on one of the terminals UE registered with the radio base station, for example, the terminal with the lowest transmitted data flow. If an outage is detected, the ROT threshold is reduced by a certain value (ROT_DOWNSTEP) and the radio base station sets a bit RA to 1 to signal to all the terminals that communicate with the radio base station to reduce the flow of transmitted data. Successively, the processor checks if an outage occurs on another terminal and, if negative, increases the ROT threshold by a preset value (ROT_UPSTEP) that, for example, could be less that the decrease ROT_DOWNSTEP so as to maintain a low probability of outage.

The above-described technique, although allowing the RoT threshold value to be changed dynamically and optimized, has some drawbacks.

In fact, it should be noted that the value of the RoT threshold is decreased whenever an outage occurs on a terminal, or rather when the connection between the mobile radio station and the terminal is lost. Basically, the method described in WO 2004/114715 reacts to the outage of a terminal, but is not able to prevent this outage.

WO 2005/112485 describes a method to facilitate the uplink transfer of data from a user terminal. The method contemplates periodically determining the RoT level, periodically transmitting a RoT level indicator from a NodeB to a user terminal over a first control channel, periodically determining a mean aggregate network load value and periodically transmitting an indicator of this mean aggregate load value from the NodeB to the user terminal over a second control channel. The NodeB measures the instantaneous RoT value and sets the persistence parameter D to send to each user terminal with the value −1 if the RoT value is greater than a first preset threshold, 1 if the RoT value is less than a second preset threshold, and 0 in all other cases. This technique also reacts to changes in RoT by modifying the parameters of user terminals, but does not allow outage on these same terminals to be prevented.

SUMMARY OF THE INVENTION

The object of the present invention is to provide a method for calculating a RoT threshold value that allows the outage of user terminals to be prevented, while at the same time maximizing the available uplink capacity of user terminals to the base station. This object is achieved by a method for calculating a RoT threshold value in a communication system in which a plurality of user terminals communicate with a base transceiver station, said method including the steps of:

a) providing a minimum RoT threshold and a maximum RoT threshold, b) providing a RoT margin, c) acquiring the maximum nominal transmit power of each user terminal of said plurality of user terminals, d) detecting the power transmitted from each user terminal, e) calculating, for each user terminal, the power difference between the maximum nominal transmit power and the transmitted power, f) processing the calculated power difference for each user terminal, the RoT margin and the minimum and maximum RoT threshold values to calculate a RoT threshold value.

In accordance with a further aspect, this object is achieved by a communication system for calculating a RoT threshold value comprising:

a plurality of user terminals, a plurality of cells, each comprising a base station subsystem adapted to provide communication services to each user terminal located in its respective cell, each base station subsystem comprising one or more base transceiver stations, a base station controller in signal communication with each base station subsystem, wherein said base station controller comprises:

storage means designed for storing a minimum RoT threshold value, a maximum RoT threshold value, and a RoT margin and the maximum nominal transmit power of each user terminal, and processing means designed for:

detecting the power transmitted from each user terminal, calculating, for each user terminal, the power difference between the maximum nominal transmit power and the transmitted power, processing the calculated power difference for each user terminal, the RoT margin and the minimum and maximum RoT threshold values to calculate a RoT threshold value.

BRIEF DESCRIPTION OF THE DRAWINGS

Further characteristics and advantages of the method and the communication system for calculating a RoT threshold value according to the present invention shall appear from the description provided below of a preferred embodiment, given by way of non-limitative example and with reference to the enclosed figures, where.

DETAILED DESCRIPTION OF THE PREFERRED EMBODIMENTS

Figure 1:
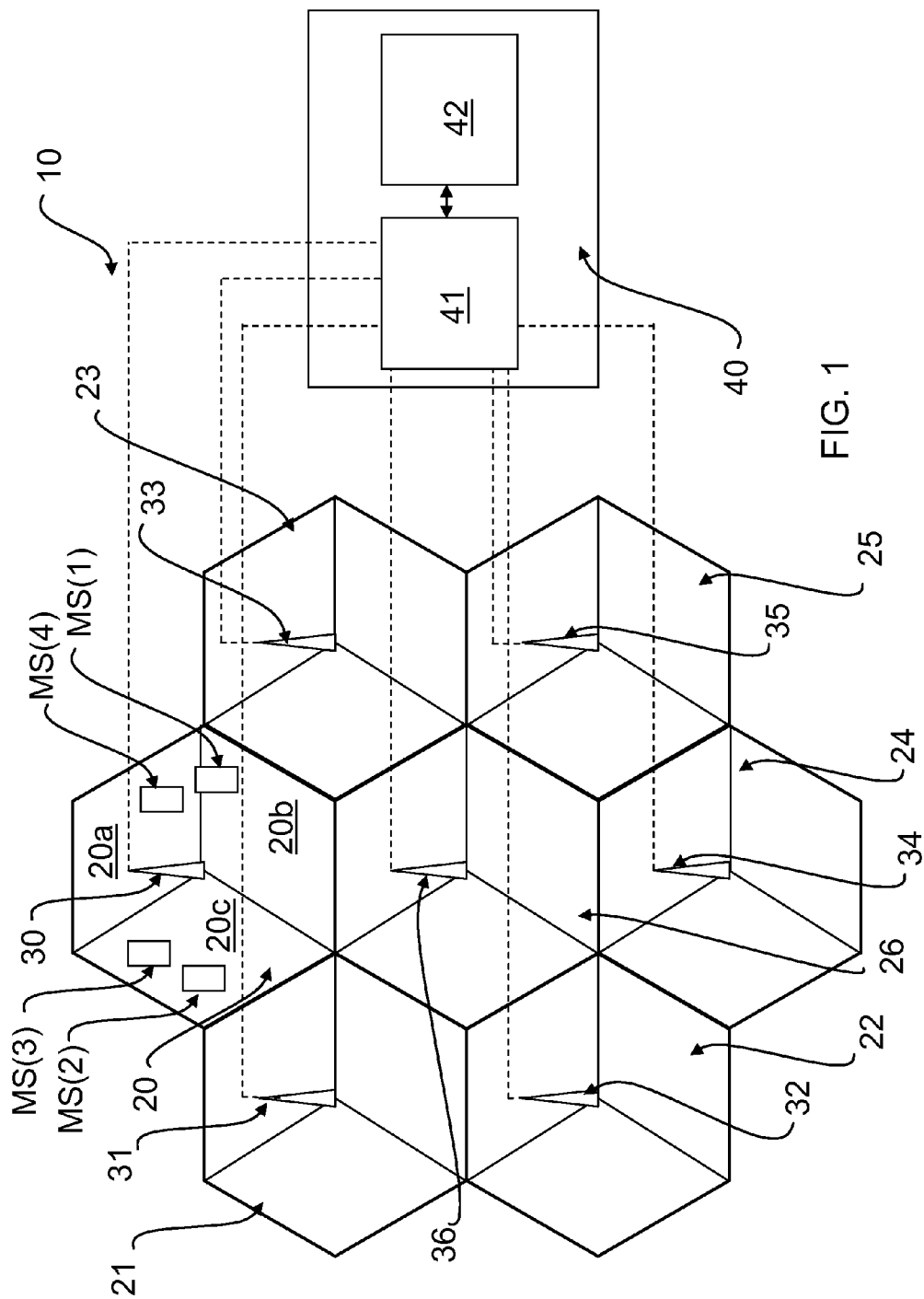
FIG. 1 shows a schematic view of a communication system for calculating a RoT threshold value in accordance with an embodiment of the present invention.
Figure 2:
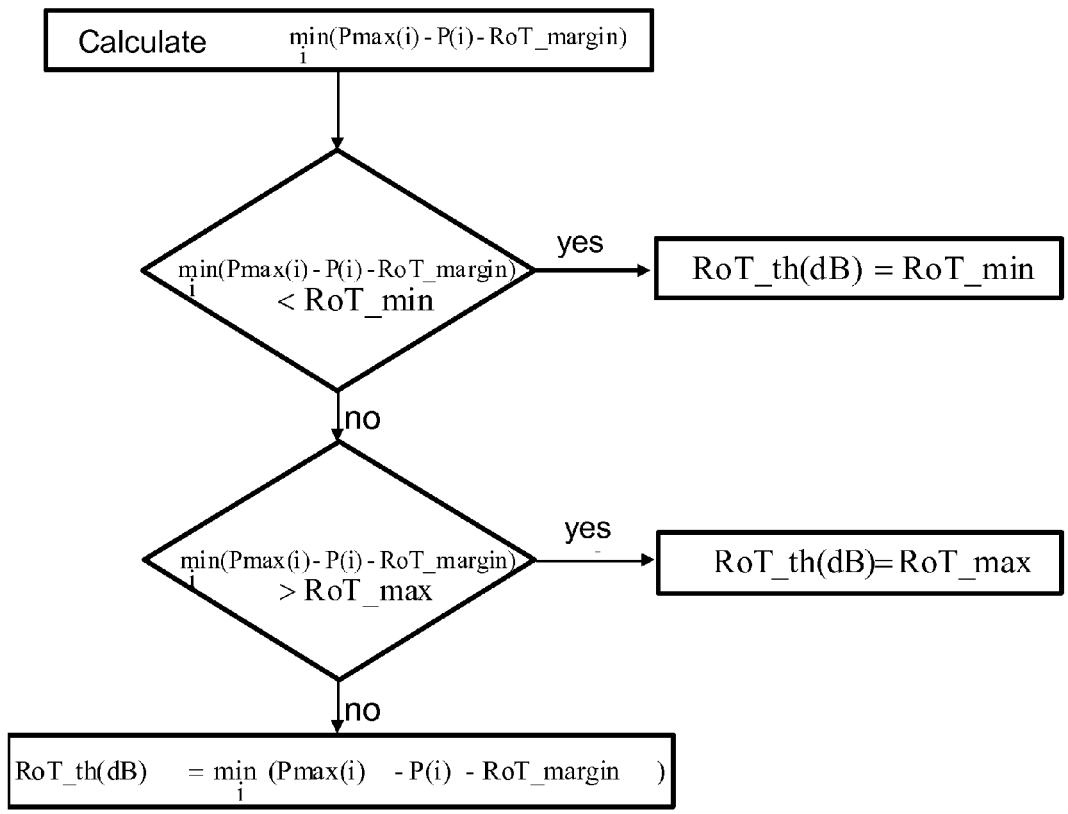
FIG. 2 shows a flow diagram of a method for calculating a RoT threshold value in accordance with a first embodiment of the present invention.

With reference to FIG. 1, reference numeral 10 globally indicates a communication system in accordance with the present invention.

The communication system 10 comprises a plurality of cells 20-26, each one subdivided into a plurality of sectors, for example, sectors 20a-20c in cell 20. In each cell 20-26, there is a base station subsystem (BSS) 30-36 able to provide communication services to each user terminal (UE), for example a mobile terminal (MS), located in the respective cell 20-26.

Each base station subsystem (BSS) 30-36 comprises one or more base transceiver stations (BTS), each one able to communicate wirelessly with the user terminals located in the sectors of the cell served by the respective BSS. In the example shown in FIG. 1, each BSS subsystem 30-36 comprises a BTS station.

The communication system 10 also comprises a base station controller (BSC) 40, in signal communication with each BSS 30-36 and a plurality of user terminals, mobile terminals MS(i) in the example, each in signal communication with one or more BTSes.

It is useful to note that the BSS, BTS and BSC elements in a GSM system correspond to the RNS, NodeB and RNC elements in a UMTS system.

The connection between a mobile terminal MS(i) located in a cell and a BTS station is represented by a downlink leg DL, from the BTS to the mobile terminal MS(i), and by an uplink leg UL, from the mobile terminal MS(i) to the BTS.

The mobile terminals MS(i) with active connections communicate with the respective BTS, transmitting with power P(i) over the uplink leg to the respective BTS.

The base station controller 40 comprises processing means 41 able to receive the value of the power P(i) transmitted from each mobile terminal MS(i) with an active connection and the value of the maximum nominal transmit power Pmax(i) of each mobile terminal MS(i) with an active connection. For each mobile terminal MS(i) with an active connection, the processing means 41 are able to calculate the power difference DP(i) between the maximum nominal transmit power Pmax(i) and the transmitted power P(i), i.e. DP(i)=Pmax(i)−P(i).

The base station controller 40 also comprises storage means 42 coupled to the processing means 41 and able to store a minimum RoT threshold RoT_min and a maximum RoT threshold RoT_max between which the RoT threshold value RoT_th can vary and a RoT margin RoT_margin.

In accordance with one embodiment, the values of the maximum nominal transmit power Pmax(i) of each mobile terminal MS(i) with an active connection are transmitted from the respective mobile terminals MS(i) in the step of establishing a connection and received by the base station controller 40 and then stored in the storage means 42 until the end of the connection with the respective mobile terminal MS(i).

The processing means 41 are able to process the power difference DP(i) calculated for each mobile terminal MS(i), the RoT margin RoT_margin and the minimum and maximum RoT thresholds RoT_min and RoT_max for calculating a RoT threshold value RoT_th and thereby regulate said RoT threshold value.

It is useful to note that the RoT threshold value RoT_th can be sent from the base station controller 40 to the BTSes using the standard 3GPP NBAP Physical Shared Channel Reconfiguration Request message. This aspect will be discussed in detail further on in the description.

The calculation of the RoT threshold value RoT_th can be carried out at predetermined time intervals configured by the network in order to calculate a RoT threshold value RoT_th(t) for each time t.

In accordance with one embodiment, the time Dt between two successive times, t−1 and t, can be controlled by a specific parameter (timeBetweenUpdate), which is configurable and stored in the storage means 42 of base station controller 40.

In accordance with a first embodiment, the RoT threshold value RoT_th is chosen from the minimum RoT threshold value RoT_min, the maximum RoT threshold value RoT_max and the minimum of the power difference values DP(i) of each mobile terminal and the RoT margin RoT_margin.

In particular, in accordance with one embodiment, the RoT threshold value RoT_th is equal to:

the minimum RoT threshold value RoT_min if the minimum min(DP(i)−RoT_margin) of the difference values between the power difference DP(i) and the margin RoT_margin is less than the minimum RoT threshold value RoT_min, the maximum RoT threshold value RoT_max if the minimum min(DP(i)−RoT_margin) of the difference values between the power difference DP(i) and the margin RoT_margin is greater than the maximum RoT threshold value RoT_max, the minimum min(DP(i)−RoT_margin) of the difference values between the power difference DP(i) and the margin RoT_margin if the minimum min(DP(i)−RoT_margin) of the difference values between the power difference DP(i) and the margin RoT_margin is between the minimum RoT threshold value RoT_min and the maximum RoT threshold value RoT_max.

Summarizing:

$$RoT\_th(dB) = \begin{cases} RoT\_min \text{ if } \min_i\left(\frac{Pmax(i) - P(i) -}{RoT\_margin}\right) < RoT\_min \\ \min_i\left(\frac{Pmax(i) - P(i) -}{RoT\_margin}\right) \text{ if } RoT\_min < \min_i\left(\frac{Pmax(i) - P(i) -}{RoT\_margin}\right) < RoT\_max \\ RoT\_max \text{ if } \min_i\left(\frac{Pmax(i) - P(i) -}{RoT\_margin}\right) > RoT\_max \end{cases}$$

This embodiment is particularly advantageous for obtaining a RoT threshold value RoT_th when a previous value is absent, for example, when the RoT threshold value RoT_th is calculated for the first time.

However, it should be noted that the above-mentioned embodiment can also be used to calculate the RoT threshold value after this value has been calculated for the first time.

In accordance with a second embodiment, the RoT threshold value at time t RoT_th(t) is periodically regulated by increasing or reducing the RoT threshold value at time t−1 RoT_th(t−1). This embodiment is particularly advantageous for regulating the RoT threshold value RoT_th in the presence of previously calculated RoT threshold values, and therefore for regulating the RoT threshold value in a continuative and dynamic manner.

In particular, in accordance with this embodiment, the processing means 41 are able to determine the minimum of the power difference values DP(i) and compare the thus obtained minimum value with the margin value RoT_margin stored in the storage means 42.

If the minimum min(DP(i)) of the power difference values DP(i) is greater than the margin RoT_margin, then the RoT threshold RoT_th(t) at time t is increased with respect to the RoT threshold RoT_th(t−1) at time t−1.

If the minimum min(DP(i)) of the power difference values DP(i) is less than the margin RoT_margin, the RoT threshold RoT_th(t) at time t is decreased with respect to the RoT threshold RoT_th(t−1) at time t−1.

In particular, in accordance with one embodiment, if the minimum min(DP(i)) of the power difference values DP(i) is greater than the margin RoT_margin, the RoT threshold RoT_th(t) at time t is equal to the minimum between the maximum RoT threshold value RoT_max and the RoT threshold value at time t−1 RoT_th(t−1) incremented by a preset incremental value (deltaStepUp); otherwise, if the minimum min(DP(i)) of the power difference values DP(i) is less than or equal to the RoT margin RoT_margin, the RoT threshold RoT_th(t) at time t is equal to the minimum between the minimum RoT threshold value RoT_min and the RoT threshold value at time t−1 RoT_th(t−1) decremented by a preset decremental value (deltaStepDown).

In other words, the base station controller 40 periodically assigns a new RoT threshold value RoT_th(t), increasing or decreasing the previous value RoT_th(t−1) according to the following formula:

$$\text{RoT\_th}(t)(\text{dB}) =$$
$$\begin{cases} \min\left(\text{RoT\_max}, \left(\text{RoT\_th}(t-1) + deltaStepUp\right. \text{ if } \min_i(\text{Pmax}(i) - P(i)) > \text{RoT\_margin} \right. \\ \max\left(\text{RoT\_min}, \left(\text{RoT\_th}(t-1) - deltaStepDown\right. \text{ if } \min_i(\text{Pmax}(i) - P(i)) \leq \text{RoT\_margin} \right. \end{cases}$$

As previously stated, the time Dt between two successive times, t−1 and t, can be controlled by a specific parameter (timeBetweenUpdate) that is also configurable.

According to one embodiment, the method envisages the calculation of a plurality of RoT threshold values RoT_th(j) with t−1<j<t, between time t−1 and time t. The plurality of RoT threshold values RoT_th(j) can be processed and, in particular, be filtered, for example, by means of a filter that determines the mean value.

The mean value obtained in this manner between time t−1 and time t represents the RoT threshold value RoT_th(t) at time t.

In 3GPP UMTS communication systems, the power difference value DP(i) between the maximum nominal transmit power Pmax(i) and the transmitted power P(i) of each mobile terminal can be calculated as a function of appropriate measurement events that allow the base station controller 40 to receive from the mobile terminal the actual power value P(i) transmitted from each mobile terminal if this power value is greater or less than a configurable power threshold P_th.

In this case, the base station controller 40 transmits a measurement control message to each mobile terminal MS(i) to activate a process in the user terminal for measuring the current power P(i).

It should be noted that the base station controller 40 has previously acquired the maximum nominal transmit power value Pmax(i) of each mobile terminal, for example, in the step of connecting the mobile terminal MS(i) to the network 10. The power threshold value P_th is also set to the difference between the maximum nominal transmit power Pmax(i) and the RoT margin RoT_margin, namely P_th=Pmax(i)−RoT_margin.

When the power P(i) transmitted from a mobile terminal MS(i) exceeds the power threshold value P_th, the mobile terminal MS(i) reports this event to the base station controller 40, which acquires the power value P(i) transmitted from the mobile terminal MS(i) and detects that the power difference value DP(i) is less than the RoT margin RoT_margin.

Subsequently, when the power P(i) transmitted from a mobile terminal MS(i) drops below the power threshold value P_th, the mobile terminal MS(i) reports this event to the base station controller 40, which acquires the power value P(i) transmitted from the mobile terminal MS(i) and detects that the power difference value DP(i) is greater than the RoT margin RoT_margin.

Figure 3:
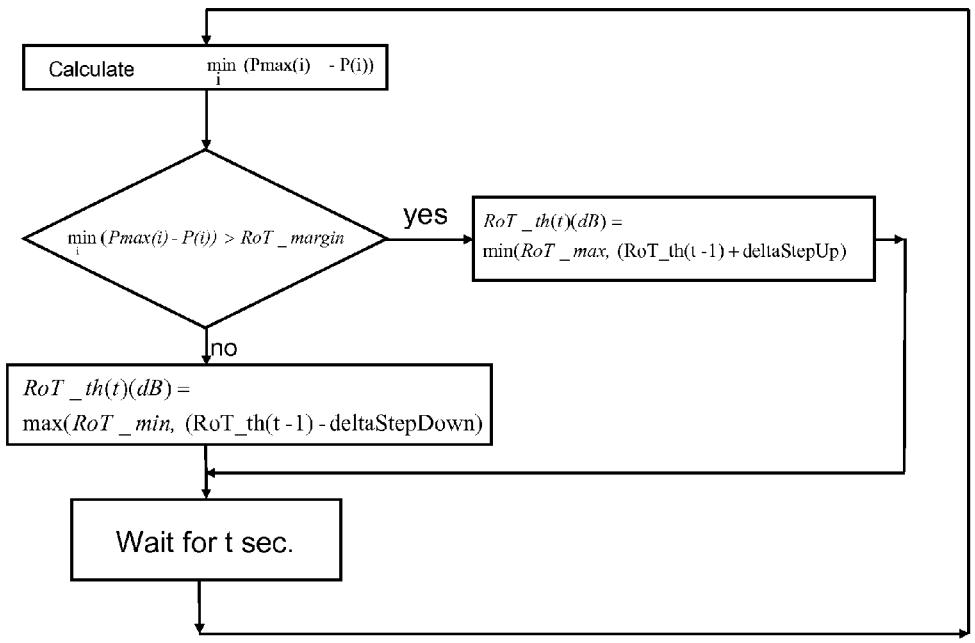
FIG. 3 shows a flow diagram of a method for calculating a RoT threshold value in accordance with a second embodiment of the present invention.
Figure 4:
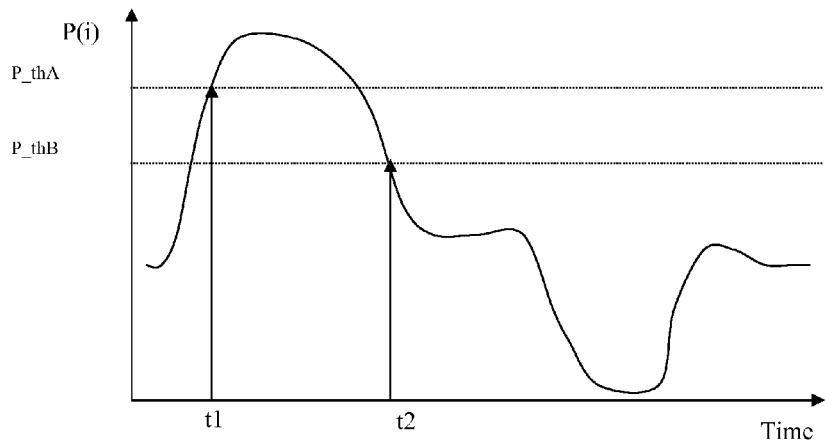
FIG. 4 shows an example of the evolution of transmitted power from a mobile terminal over time.

As shown by way of example in FIG. 3, the power threshold P_th can have more than one value, with two distinct values P_thA and P_thB in the example.

In this case, when the power P(i) transmitted from a mobile terminal MS(i) exceeds the first power threshold value P_thA, the mobile terminal MS(i) reports this event, at time t1, to the base station controller 40, which acquires the power value P(i) transmitted from the mobile terminal MS(i) and detects that the power difference value DP(i) is less than the RoT margin RoT_margin.

Subsequently, when the power P(i) transmitted from a mobile terminal MS(i) drops below the second power threshold value P_thB, the mobile terminal MS(i) reports this event, at time t2, to the base station controller 40, which acquires the power value P(i) transmitted from the mobile terminal MS(i) and detects that the power difference value DP(i) is greater than the RoT margin RoT_margin.

The calculated RoT threshold value RoT_th is subsequently used by the BTS to control the mobile terminals MS(i).

In particular, the BTS is configured to receive information from the base station controller 40 representative of the calculated RoT threshold value RoT_th and control the highest power transmissible from each user terminal MS(i) based upon this received RoT threshold value RoT_th.

In accordance with a first embodiment, the base station controller 40 is configured to send the calculated RoT threshold value RoT_th to the BTS.

In accordance with a second embodiment, the storage means 42 are configured to store a reference background noise value (Reference Received Total Wide Band Power) and the processing means 41 are configured to calculate a maximum admissible interference value for said base transceiver station (Maximum Target Received Total Wide Band Power) by means of the following relation Maximum Target Received Total Wide Band Power (dBm)==RoT_th (dB)+Reference Received Total Wide Band Power (dBm), where
Reference Received Total Wide Band Power (dBm) represents the reference background noise stored in the storage means 42 and RoT_th represents the calculated RoT threshold value,
and to send information to the BTS including the stored reference background noise value, Reference Received Total Wide Band Power, and the calculated maximum admissible interference value, Maximum Target Received Total Wide Band Power.

The BTS is then configured to receive this information from the base station controller 40 and calculate the RoT threshold value RoT_th by means of the above-mentioned relation.

As previously stated, the RoT threshold value RoT_th calculated by the base station controller 40 can be transmitted to the BTS by the base station controller 40 in the NPAB Physical Shared Channel Reconfiguration message, using the standard Reference Received Total Wide Band Power and Maximum Target Received Total Wide Band Power fields, where:

Reference Received Total Wide Band Power represents the known reference background noise value for the network considered, statically set or dynamically calculated by the base station controller 40 on the basis of algorithms known to experts in the field, and Maximum Target Received Total Wide Band Power represents the maximum admissible interference for the BTS and is calculated using the following relation:

Maximum Target Received Total Wide Band Power (dBm)==RoT_th(t)(dB)+Reference Received Total Wide Band Power (dBm), which, in power, is expressed as:

Maximum Target Received Total Wide Band Power (W)==RoT_th(t)*Reference Received Total Wide Band Power (W).

Based on these two values received from the base station controller 40, the BTS can obtain the RoT_th(t) value as the ratio between Maximum Target Received Total Wide Band Power and Reference Received Total Wide Band Power values.

In the 3GPP standard, by means of specially provided channels on the downlink leg, E-AGCH and E-RGCH, the NodeB informs the mobile terminals MS(i) with HSUPA connections in course of the maximum power that each of them is authorized to transmit within each transmission time interval (TTI), so that the sum of the interference contributions of the powers transmitted from the mobile terminals MS(i) and received by the NodeB and the background noise (Reference Received Total Wide Band Power) on the uplink leg is less than the maximum admissible interference for the NodeB (Maximum Target Received Total Wide Band Power). In other words, the NodeB disposes of additional interference resources with respect to the background noise (RoT_th(t)) and distributes these resources between the various mobile terminals MS(i) with HSUPA connections.

According to a further aspect, the invention concerns a computer product that can be directly loaded into the memory of a numerical processing device, comprising portions of program code that embody the method of the invention when made to run on the numerical processing device.

As can be appreciated from what has been described, the method and system according to the present invention allow the drawbacks mentioned with reference to the known art to be overcome. In the case in point, the invention allows the impact of raising the permitted RoT value on the contraction of coverage for the uplink leg to be controlled in a direct and reliable manner. The present invention allows the RoT threshold value to be continuously adjusted to avoid, or opportunely control, the impact of coverage contraction on the uplink leg and, at the same time, maximize the admissible RoT threshold value in order to maximize the capacity of the cell.

Obviously, for the purpose of satisfying contingent requirements and specifications, an expert in the field could make numerous modifications to and variants of the method and system according to the above-described invention, all however falling within the invention's scope of protection, as defined in the following claims.

The invention claimed is:

1. A method for calculating a Rise-over-Thermal (RoT) threshold value in a communication system in which a plurality of user terminals communicate with a base transceiver station, said method including the steps of:
  a) providing a minimum RoT threshold and a maximum RoT threshold,
  b) providing a RoT margin,
  c) acquiring the maximum nominal transmit power of each user terminal of said plurality of user terminals,
  d) detecting the power transmitted from each user terminal,
  e) calculating, for each user terminal, the power difference between the maximum nominal transmit power and the transmitted power,
  f) processing the calculated power difference for each user terminal, the RoT margin and the minimum and maximum RoT threshold values to calculate a RoT threshold value.

2. A method as claimed in claim 1, wherein said step f) comprises the steps of:
  determining the minimum difference value between the power difference calculated for each mobile terminal and the RoT margin,
  comparing said minimum difference value, the minimum RoT threshold and the maximum RoT threshold,
  setting the RoT threshold value to
    the minimum RoT threshold value if said minimum difference value is lower than the minimum RoT threshold value,
    the maximum RoT threshold value if said minimum difference value is higher than the maximum RoT threshold value,
    said minimum difference value, if said minimum difference value falls in the range from the minimum RoT threshold value to the maximum RoT threshold value.

3. A method as claimed in claim 1, wherein said step f) includes the steps of periodically increasing or decreasing the RoT threshold value at the time t from the RoT threshold value at the time t−1 by a predetermined incremental or decrement value.

4. A method as claimed in claim 3, wherein said step f) comprises the steps of:
  determining the minimum power difference value among the calculated power difference values,
  comparing said determined minimum value with the RoT margin,
  increasing the RoT threshold value at the time t from the RoT threshold value at the time t−1, if said determined minimum value is higher than the RoT margin, or
  decreasing the RoT threshold value at the time t from the RoT threshold value at the time t−1, if said determined minimum value is lower than the RoT margin.

5. A method as claimed in claim 3, wherein said step f) comprises the steps of:
  setting the RoT threshold value at the time t to
    the lower value between the maximum RoT threshold value and the RoT threshold value at the time t−1 increased by a predetermined incremental value, if the minimum power difference value among power difference values is higher than the RoT margin,
    the higher value between the minimum RoT threshold value and the RoT threshold value at the time t−1 decreased by a predetermined decremental value, if the minimum power difference value among power difference values is equal to or lower than the RoT margin.

6. A method as claimed in claim 1, wherein said steps d), e) and f) are repeated at predetermined time intervals to calculate a RoT threshold value at each instant of time.

7. A method for controlling a communication system in which a plurality of user terminals communicate with a base transceiver station in communication with a base station controller, said method including the steps of:
  calculating, in said base station controller, a Rise-over-Thermal (RoT) threshold value as claimed in claim 1,
  g) receiving, in said base transceiver station, an information representative of said calculated RoT threshold value,
  h) controlling the highest power transmissible from each user terminal as a function of said RoT threshold value received in said base transceiver station.

8. A method as claimed in claim 7, wherein said step g) comprises the steps of:
  providing a reference background noise value in said base station controller, calculating a value of maximum interference admissible from said base transceiver station, in said base station controller, using the following relation:

Maximum Target Received Total Wide Band Power (dBm)=RoT_th (dB)+Reference Received Total Wide Band Power (dBm), where
Reference Received Total Wide Band Power represents the provided reference background noise,
RoT_th represents the calculated RoT threshold value,
  transmitting information from said base station controller to said base transceiver station, which information comprises said provided reference background noise value and said maximum admissible interference value,
  calculating the RoT threshold value in said base transceiver station, using the above relation.

9. A communication system for calculating a Rise-over-Thermal (RoT) threshold value, comprising:
  a plurality of user terminals,
  a plurality of cells, each comprising a base station subsystem adapted to provide communication services to each user terminal located in its respective cell, each base station subsystem comprising one or more base transceiver stations,
  a base station controller in signal communication with each base station subsystem, wherein
  said base station controller comprises:
    storage means designed for storing a minimum RoT threshold value, a maximum RoT threshold value, and a RoT margin and the maximum nominal transmit power of each user terminal, and
    processing means designed for:
      detecting the power transmitted from each user terminal,
      calculating, for each user terminal, the power difference between the maximum nominal transmit power and the transmitted power,
      processing the calculated power difference for each user terminal, the RoT margin and the minimum and maximum RoT threshold values to calculate a RoT threshold value.

10. A communication system as claimed in claim 9, wherein said processing means are designed for:
  determining the minimum difference value between the power difference calculated for each mobile terminal and the RoT margin,
  comparing said minimum difference value, the minimum RoT threshold value and the maximum RoT threshold value,
  setting the RoT threshold value to
    the minimum RoT threshold value if said minimum difference value is lower than the minimum RoT threshold value,
    the maximum RoT threshold value if said minimum difference value is higher than the maximum RoT threshold value,
    said minimum difference value, if said minimum difference value falls in the range from the minimum RoT threshold value to the maximum RoT threshold value.

11. A communication system as claimed in claim 9, wherein said processing means are designed for periodically increasing or decreasing the RoT threshold value at the time t from the RoT threshold value at the time t−1 by a predetermined incremental or decremental value.

12. A communication system as claimed in claim 11, wherein said processing means are designed for:
  determining the minimum power difference value among the calculated power difference values,
  comparing said determined minimum value with the RoT margin,
  increasing the RoT threshold value at the time t from the RoT threshold value at the time t−1, if said determined minimum value is higher than the RoT margin, or
  decreasing the RoT threshold value at the time t from the RoT threshold value at the time t−1, if said determined minimum value is lower than the RoT margin.

13. A communication system as claimed in claim 11, wherein said processing means are designed for:
  setting the RoT threshold value at the time t to
    the lower value between the maximum RoT threshold value and the RoT threshold value at the time t−1 increased by a predetermined incremental value, if the minimum power difference value among power difference values is higher than the RoT margin,
    the higher value between the minimum RoT threshold value and the RoT threshold value at the time t−1 decreased by a predetermined decremental value, if the minimum power difference value among power difference values is equal to or lower than the RoT margin.

14. A communication system as claimed in claim 9, wherein said processing means are designed to calculate a RoT threshold value at predetermined time intervals.

15. A communication system as claimed in claim 9, wherein said base transceiver station is designed for:
  receiving, from said base station controller, an information representative of said Rise-over-Thermal threshold value calculated by the processing means of the base station controller,
  controlling the highest power transmissible from each user terminal as a function of said received RoT threshold value.

16. A communication system as claimed in claim 15, wherein
  said storage means are designed to store a reference background noise value,
  said processing means are designed for:
    calculating a value of maximum interference admissible from said base transceiver station using the following relation:

Maximum Target Received Total Wide Band Power (dBm)=RoT_th (dB)+Reference Received Total Wide Band Power (dBm), where
Reference Received Total Wide Band Power represents the reference background noise stored in the storage means,
RoT_th represents the calculated RoT threshold value
  transmitting information to said base transceiver station, which information comprises said provided reference background noise value and said maximum admissible interference value,
  said base transceiver station is designed for:
  receiving said information from said base station controller and
  calculating the RoT threshold value using the above relation.

* * * * *